US012626370B2

(12) United States Patent
Liu et al.

(10) Patent No.: US 12,626,370 B2
(45) Date of Patent: May 12, 2026

(54) MACHINE LEARNING METHOD DISTINGUISHING FOREGROUND AND BACKGROUND OF IMAGE

(71) Applicants: HON HAI PRECISION INDUSTRY CO., LTD., New Taipei (TW); Foxconn Technology Group Co., Ltd., Guangdong Province (CN)

(72) Inventors: Shen-Hsuan Liu, New Taipei (TW); Van Nhiem Tran, New Taipei (TW); Kai-Lin Yang, New Taipei (TW); Chi-En Huang, New Taipei (TW); Muhammad Saqlain Aslam, New Taipei (TW); Yung-Hui Li, New Taipei (TW)

(73) Assignees: HON HAI PRECISION INDUSTRY CO., LTD., New Taipei City (TW); Foxconn Technology Group Co., Ltd., Guangdong Province (CN)

( * ) Notice: Subject to any disclaimer, the term of this patent is extended or adjusted under 35 U.S.C. 154(b) by 373 days.

(21) Appl. No.: 18/471,318

(22) Filed: Sep. 21, 2023

(65) Prior Publication Data

US 2024/0095930 A1      Mar. 21, 2024

Related U.S. Application Data

(60) Provisional application No. 63/376,443, filed on Sep. 21, 2022.

(51) Int. Cl.
| | |
|---|---|
| *G06T 7/194* | (2017.01) |
| *G06T 7/11* | (2017.01) |

(52) U.S. Cl.
CPC ............... *G06T 7/194* (2017.01); *G06T 7/11* (2017.01); *G06T 2207/20081* (2013.01)

(58) Field of Classification Search
CPC .. G06T 7/194; G06T 7/11; G06T 2207/20081
See application file for complete search history.

(56) References Cited

U.S. PATENT DOCUMENTS

| | | | | |
|---|---|---|---|---|
| 10,332,261 | B1 * | 6/2019 | Farivar | G06N 3/08 |
| 10,872,262 | B2 * | 12/2020 | Yano | G06V 40/10 |
| 11,276,177 | B1 * | 3/2022 | Tsai | G06T 7/174 |
| 11,640,721 | B2 * | 5/2023 | Ma | G06T 7/90 |
| | | | | 382/162 |
| 11,783,563 | B2 * | 10/2023 | Yaghoubi | G06T 7/168 |
| | | | | 382/128 |

(Continued)

*Primary Examiner* — Mia M Thomas

(74) *Attorney, Agent, or Firm* — CKC & Partners Co., LLC

(57) ABSTRACT

A method used in application of training a model of machine learning is described. Foregrounds and backgrounds of a first image are distinguished to generate a first mask image. The first image is cropped to generate second and third images. The first mask image is cropped to generate second and third mask images. Positions of the second and the third mask image correspond to positions of the second and the third image, respectively. First and second feature vector groups of the second image and the third image are generated by a model. A first matrix is generated according to the first and second feature vector groups. A second matrix is generated according to the second and third mask images. A function is generated according to the first and second matrices. The model is adjusted according to the function.

20 Claims, 5 Drawing Sheets

(56)  References Cited

U.S. PATENT DOCUMENTS

| | | | |
|---|---|---|---|
| 11,798,263 B1 * | 10/2023 | Prabhudesai | G06V 10/764 |
| 11,887,313 B2 * | 1/2024 | Sanderson | G06T 7/11 |
| 11,943,557 B2 * | 3/2024 | Kim | H04N 5/2226 |
| 12,229,462 B2 * | 2/2025 | Pamuru | G06Q 30/0621 |
| 12,475,589 B1 * | 11/2025 | Beer Mohideen | G06T 7/246 |
| 2017/0091951 A1 * | 3/2017 | Yoo | G06T 7/11 |
| 2019/0042826 A1 * | 2/2019 | Chang | G06T 7/11 |
| 2019/0180443 A1 * | 6/2019 | Xue | G06T 7/13 |
| 2019/0325246 A1 * | 10/2019 | Baidya | G06V 10/25 |
| 2019/0325578 A1 * | 10/2019 | Mohammad | G06N 3/045 |
| 2021/0049357 A1 * | 2/2021 | Sarkar | G06V 30/412 |
| 2021/0118112 A1 * | 4/2021 | Huang | G06T 3/40 |
| 2021/0118139 A1 * | 4/2021 | Xu | A61B 6/502 |
| 2021/0158561 A1 * | 5/2021 | Park | G06T 7/74 |
| 2021/0241461 A1 * | 8/2021 | Sakai | G06N 5/04 |
| 2021/0248748 A1 * | 8/2021 | Turgutlu | G06V 10/764 |
| 2021/0248755 A1 * | 8/2021 | Cao | G06N 3/08 |
| 2022/0198677 A1 * | 6/2022 | Bisain | G06T 7/174 |
| 2022/0366670 A1 * | 11/2022 | Kim | G06V 10/454 |
| 2023/0024666 A1 * | 1/2023 | Dhana | G06V 10/46 |
| 2023/0104262 A1 * | 4/2023 | Lin | G06T 7/11 |
| | | | 382/173 |
| 2023/0196718 A1 * | 6/2023 | Li | G06T 3/40 |
| | | | 382/203 |
| 2023/0260260 A1 * | 8/2023 | Li | G06V 10/26 |
| 2023/0368398 A1 * | 11/2023 | Figueroa-Alvarez | G06T 5/70 |
| 2024/0020791 A1 * | 1/2024 | Bao | G06N 3/02 |
| 2024/0037739 A1 * | 2/2024 | Ogasawara | G06T 7/0012 |
| 2024/0050172 A1 * | 2/2024 | Wu | G06T 7/11 |
| 2024/0054699 A1 * | 2/2024 | Freiman | G16H 30/40 |
| 2025/0037324 A1 * | 1/2025 | Li | G06T 11/00 |
| 2025/0278926 A1 * | 9/2025 | Liu | G06N 3/0455 |
| 2025/0322509 A1 * | 10/2025 | Medina | G06T 7/11 |
| 2025/0356185 A1 * | 11/2025 | Bhardwaj | G06N 3/08 |

* cited by examiner

MACHINE LEARNING METHOD DISTINGUISHING FOREGROUND AND BACKGROUND OF IMAGE

CROSS-REFERENCE TO RELATED APPLICATION

This application claims priority to U.S. Provisional Application Ser. No. 63/376,443, filed Sep. 21, 2022, which is herein incorporated by reference in its entirety.

BACKGROUND

Technical Field

The present disclosure relates to a machine learning technique. More particularly, the present disclosure relates to a machine learning method.

Description of Related Art

When a model is trained, images belonging to the same category are inputted into the model to generate a loss function. Since the images belong to the same category, adjusting parameters of the model to decrease the loss function can improve results of respective downstream missions of the model, such as classify results. However, the approaches described above may not separate foregrounds and backgrounds of the image properly, such that the training result is poor. Thus, techniques associated with the development for overcoming the problems described above are important issues in the field.

SUMMARY

The present disclosure provides a machine learning method. The machine learning method includes: distinguishing foregrounds of a first image and backgrounds of the first image to generate a first mask image; cropping the first image to generate a second image and a third image; cropping the first mask image to generate a second mask image and a third mask image, wherein a position of the second mask image and a position of the third mask image correspond to a position of the second image and a position of the third image, respectively; generating a first feature vector group of the second image and a second feature vector group of the third image by a model; generating a first matrix according to the first feature vector group and the second feature vector group; generating a second matrix according to the second mask image and the third mask image; generating a function according to the first matrix and the second matrix; and adjusting the model according to the function.

The present disclosure provides a machine learning method. The machine learning method includes: distinguishing foregrounds of a first image and backgrounds of the first image to generate a first mask image; cropping each of the first image and the first mask image, to generate a second image and a second mask image, wherein a position of the second mask image is same as a position of the second image; generating a foreground rate of the second image according to the second mask image, the foreground rate being a foreground area divided by an image size of the second image; and when the foreground rate is larger than or equal to a preset foreground rate and the image size of the second image is larger than or equal to a preset size, generating a function at least according to the second mask image and the second image, to train a model.

The present disclosure provides a machine learning method. The machine learning method includes: generating a first mask image including a first portion and a second portion; determining a logic value of a pixel of a second mask image according to a ratio of the first portion in a corresponding region of the first mask image; generating a third mask image including a third portion having and a fourth portion; determining a logic value of a pixel of a fourth mask image according to a ratio of the third portion in a corresponding region of the third mask image; generating a function according to the second mask image and the fourth mask image; and training a model according to the function. Each of the first portion and the third portion corresponds to foregrounds of a first image, and each of the second portion and the fourth portion corresponds to backgrounds of the first image.

It is to be understood that both the foregoing general description and the following detailed description are examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
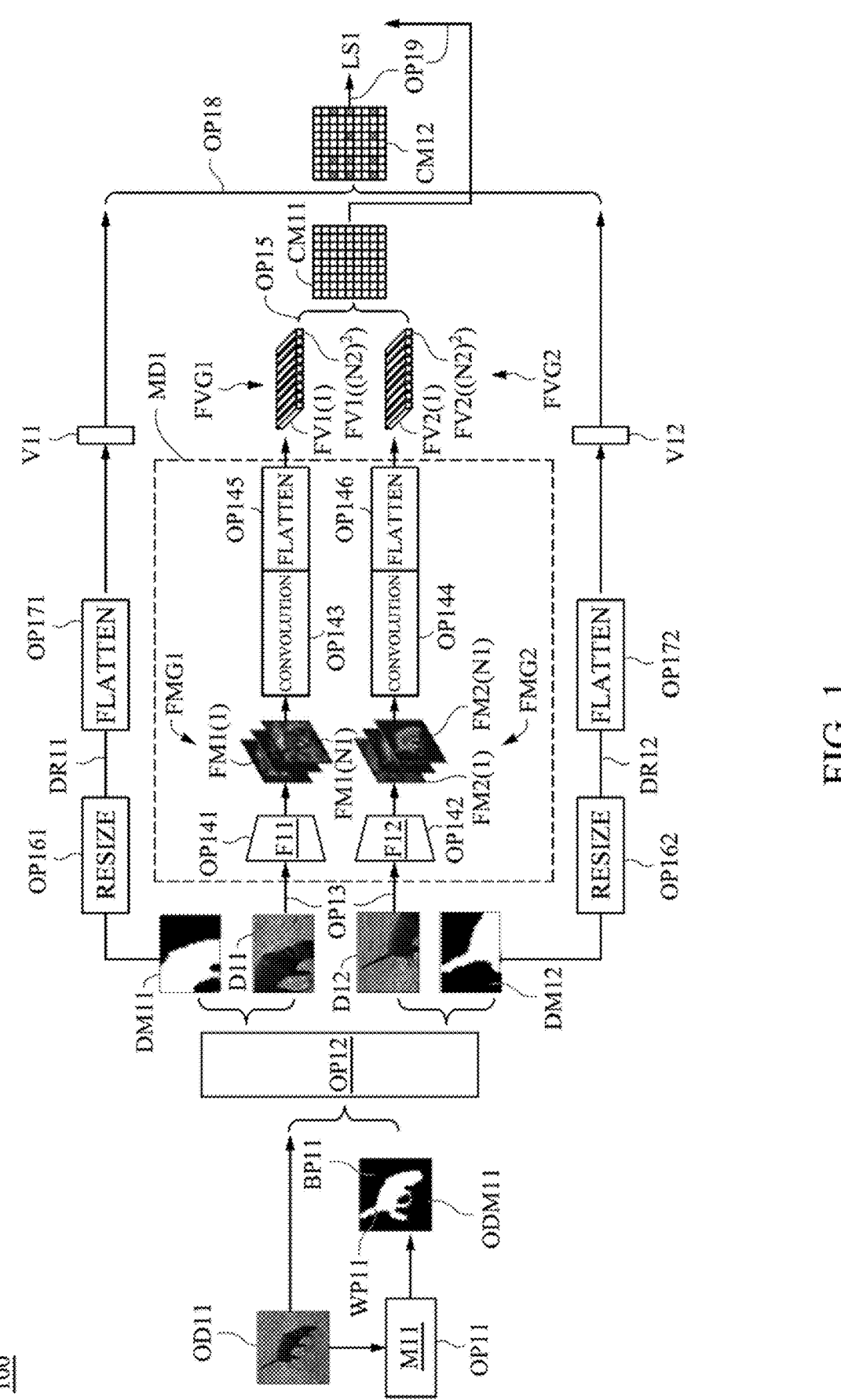
FIG. 1 is a flowchart diagram of a machine learning method illustrated according to some embodiment of present disclosure.

In the present disclosure, although the terms "first", "second", and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Hereinafter multiple embodiments of the present disclosure will be disclosed with schema, as clearly stated, the details in many practices it will be explained in the following description. It should be appreciated, however, that the details in these practices is not applied to limit the present disclosure. Also, it is to say, in some embodiments of the present disclosure, the details in these practices are non-essential. In addition, for the sake of simplifying schema, some known usual structures and element in the drawings by a manner of simply illustrating for it.

FIG. 1 is a flowchart diagram of a machine learning method 100 illustrated according to some embodiment of present disclosure. In some embodiments, the machine learning method 100 is configured to process the image OD11 at least by a model MD to generate a function LS1, and adjust the model MD1 (for example, updating parameters of the model MD1 and/or training the model MD1) according to the function LS1, such that the model can classify other images or perform other downstream missions.

As illustratively shown in FIG. 1, the machine learning method 100 includes operations OP11-OP19. However, embodiments of present disclosure are not limited to this. In different embodiments, the machine learning method 100 can perform various combinations of a part or all of the operations OP11-OP19 with various kinds of sequence. In some embodiments, the operations OP11-OP19 can be performed by a processor and/or a memory.

At the operation OP11, a mask generator M11 generates a mask image ODM11 according to the image OD11. The mask image ODM11 includes black portions BP11 and white portions WP11. In some embodiments, the mask image ODM11 corresponds to a binary mask, and the black portions BP11 and the white portions WP11 have different logic values, respectively. For example, the logic values of the black portions BP11 are 0, and the logic values of the white portions WP11 are 1.

In some embodiments, the mask image ODM11 is configured to distinguish foregrounds and backgrounds of the image ODM11. The black portions BP11 and the white portions WP11 correspond to the backgrounds and the foregrounds of the image ODM11, respectively. For example, the image OD11 corresponds to an image of a dog on field, in which the image of the field is the backgrounds and corresponds to the black portions BP11, and the image of the dog is the foregrounds and corresponds to the white portions WP11.

At the operation OP12, augment operations are performed to the image OD11 and the mask image ODM11 to generate images D11, D12 and mask images DM11, DM12, in which the images D11 and D12 correspond to the mask images DM11, DM12, respectively.

In some embodiments, the image D11 and the mask image DM11 have the same geometry augmentation, and the image D12 and the mask image DM12 have the same geometry augmentation. For example, the image D11 and the mask image DM11 have the same position and the same size, and the image D12 and the mask image DM12 have the same position and the same size. Details associated with the operation OP12 are further described following in the embodiments associated with FIG. 2 and FIG. 3.

At the operation OP13, the images D11 and D12 are inputted into the model MD1 to be processed. In some embodiments, the model MD1 performs operations OP141-OP146 to the images D11 and D12.

At the operation OP141, a feature extractor F11 extracts features from the image D11 to generate a feature map group FMG1. At the operation OP142, a feature extractor F12 extracts features from the image D12 to generate a feature map group FMG2. In some embodiments, the feature extractors F11 and F12 can be referred to as the same feature extractor.

As illustratively shown in FIG. 1, the feature map group FMG1 includes N1 feature maps FM1(1)-FM1(N1), and feature map group FMG2 also includes N1 feature maps FM2(1)-FM2(N1). It is noted that N1 corresponds to a quantity of features which can be generated by each of the feature extractors F11 and F12. In some embodiments, each feature map of the feature maps FM1(1)-FM1(N1) and FM2(1)-FM2(N1) has $N2 \times N2$ pixels. It is noted that N1 and N2 are positive integers.

At the operation OP143, convolution operations are performed to the feature map group FMG1. At the operation OP144, convolution operations are performed to the feature map group FMG2. In some embodiments, the operations OP143 and OP144 can be implemented by $1 \times 1$ convolutions.

At the operation OP145, flatten operations are performed to the result of the operation OP143, to generate a feature vector group FVG1. At the operation OP146, flatten operations are performed to the result of the operation OP144, to generate a feature vector group FVG2.

As illustratively shown in FIG. 1, the feature vector group FVG1 includes $(N2)^2$ vectors FV1(1)-FV1$((N2)^2)$. In which the vectors FV1(1)-FV1$((N2)^2)$ correspond to the $N2 \times N2$ pixels of the feature maps in the feature map group FMG1, respectively. Each of the vectors FV1(1)-FV1$((N2)^2)$ includes N3 components corresponding to the N1 features. In which N3 is referred to a quantity of the components of each of the vectors FV1(1)-FV1$((N2)^2)$, and is not shown in the figures. It is noted that N3 is a positive integer. In various embodiments, N3 can be equal to N1 and can be not equal to N1.

Similarly, the feature vector group FVG2 includes $(N2)^2$ vectors FV2(1)-FV2$((N2)^2)$. In which the vectors FV2(1)-FV2$((N2)^2)$ correspond to the $N2 \times N2$ pixels of the feature maps in the feature map group FMG2, respectively. Each of the vectors FV2(1)-FV2$((N2)^2)$ includes N3 components corresponding to the N1 features.

At the operation OP15, a similarity matrix CM11 is generated according to the feature vector groups FVG1 and FVG2. The similarity matrix CM11 corresponds to the association of the feature vector groups FVG1 and FVG2. In some embodiments, inner products can be performed to the feature vector groups FVG1 and FVG2, to generate the similarity matrix CM11. For example, a inner product is performed to the vectors FV1($i$) and FV2($j$), to generate the (i, j)th component of the similarity matrix CM11, in which i and j are positive integer. In some embodiments, the similarity matrix CM11 has similarity values of the $(N2)^2 \times (N2)^2$ components, and each similarity value represents a similarity between N1 features of one pixel in the $(N2)^2$ pixels of the feature map group FMG1 and N1 features of one pixel in the $(N2)^2$ pixels of the feature map group FMG2.

At the operation OP161, the mask image DM11 is resized according to a size of the feature map in the feature map group FMG1, to generate a mask image DR11. Similarly, at the operation OP162, the mask image DM12 is resized according to a size of the feature map in the feature map group FMG2, to generate a mask image DR12. In some embodiments, a size of each of the feature map in the feature map groups FMG1 and FMG2 is N2×N2. Correspondingly, at the operations OP161 and OP162, the size of each of the mask image DM11 and DM12 is adjusted to N2×N2, to generate the mask images DR11 and DR12. Details associated with resizing are further described following in the embodiments associated with FIG. 4.

At the operation OP171, a flatten operation is performed to the mask image DR11 to generate a vector V11. At the operation OP172, a flatten operation is performed to the mask image DR12 to generate a vector V12. Details associated with the flatten operations are further described following in the embodiments associated with FIG. 4.

At the operation OP18, a mask matrix CM12 is generated according to the vectors V11 and V12. For example, an outer product calculation is performed to the vectors V11 and V12 to generate the mask matrix CM12. Details associated with the outer product calculation are further described following in the embodiments associated with FIG. 4.

At the operation OP19, the function LS1 is generated according to the similarity matrix CM11 and the mask matrix CM12. In some embodiments, the function LS1 is a loss function associated with the foregrounds and the backgrounds of the images D11 and D12. Details associated with the operation OP19 are further described following in the embodiments associated with FIG. 5.

In some embodiments, when the function LS1 is lower, a probability of two images inputted into the model MD1 belonging to the same category is larger. During the training process, the images D11 and D12 configured for training are both generated from the image OD11. Therefore, the foregrounds of the images D11 and D12 should belong to the same category. Correspondingly, when the training is performed by the images D11 and D12, the parameters of the model MD1 are adjusted, such that the function LS1 is decreased.

In some approaches, when training is performed to a model with multiple augment images from the same image to decrease a loss function, whether the augment images correspond to foregrounds or backgrounds is not considered, such that the foregrounds and the backgrounds may not be distinguished. As a result, the performance of the trained model is poor.

Compared to above approaches, in the embodiments of present disclosure, the image OD11 is distinguished into the foregrounds and the backgrounds by the mask generator M11, to generate the mask image ODM11. The mask matrix CM12 corresponding to associations of each pixel and the foregrounds and the backgrounds is generated according to the mask image ODM11. The loss function LS1 is generated according to the mask matrix CM12. As a result, when the model MD1 is trained, the conditions of the foregrounds and the backgrounds are considered separately, such that the performance of the model MD1 is improved.

Figure 2:
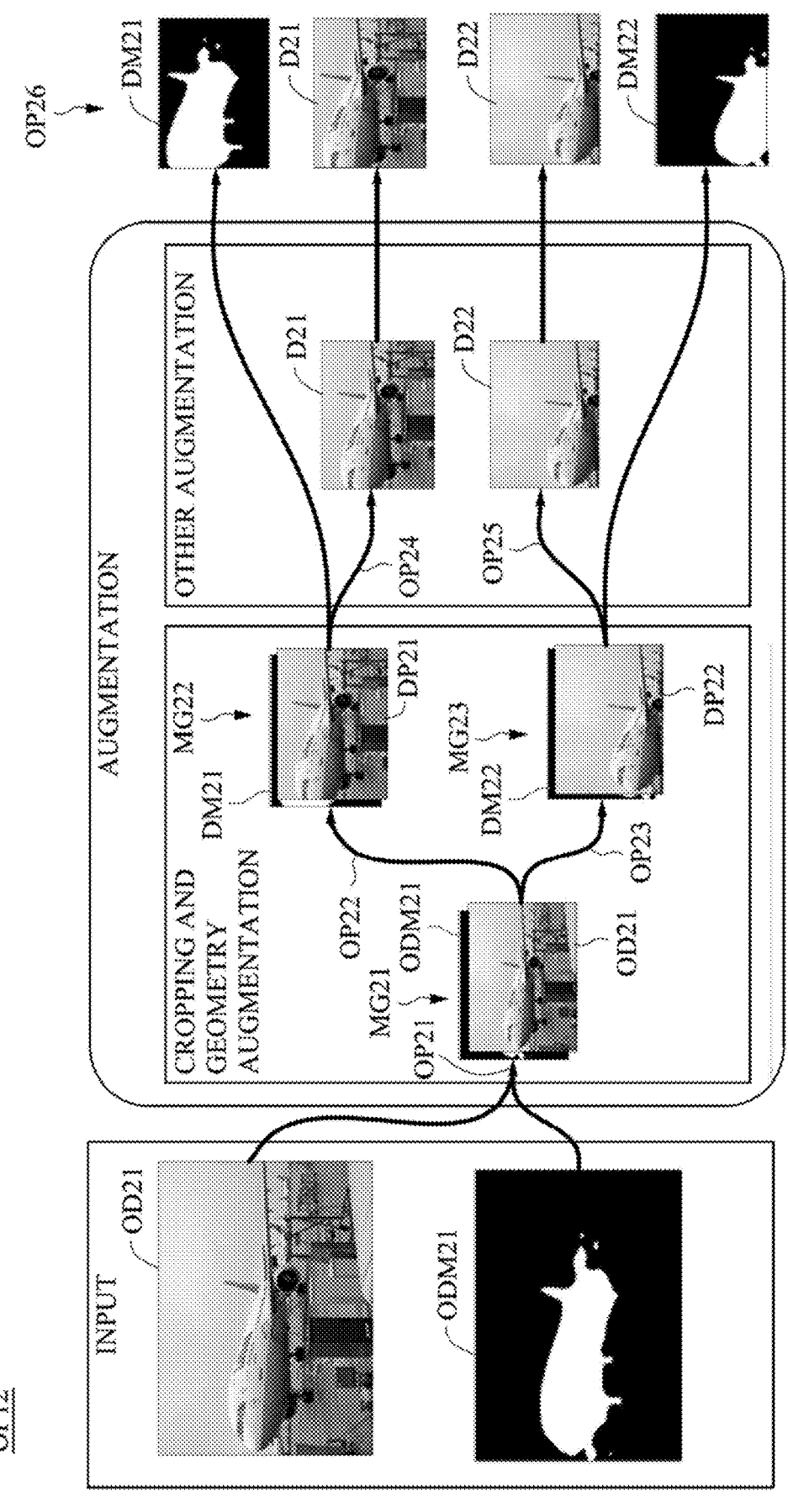
FIG. 2 is a flowchart diagram of further details of the machine learning method shown in FIG. 1, illustrated according to some embodiments of present disclosure.

FIG. 2 is a flowchart diagram of further details of the operation OP12 shown in FIG. 1, illustrated according to some embodiments of present disclosure. In some embodiments, the operation OP12 generates the images D21, D22 and the mask image DM21, DM22 according to the image OD21 and the mask image ODM21. Referring to FIG. 1 and FIG. 2, the images OD21, D21, D22 and the mask images ODM21, DM21, DM22 are embodiments of the images OD11, D11, D12 and the mask images ODM11, DM11, DM12, respectively. Therefore, some descriptions are not repeated for brevity.

As illustratively shown in FIG. 2, the operation OP12 can includes operations OP21-OP26. At the operation OP21, the image OD21 and the mask image ODM21 are stacked as an image group MG21. At the operation OP22, cropping and geometry augment operations are performed to the image group MG21 to generate an image group MG22. The image group MG22 includes an image DP21 and the mask image DM21. The image DP21 and the mask image DM21 correspond to each other and have the same cropping relationship and the same geometry relationship. For example, a position of the mask image DM21 in the mask image ODM21 is same as a position of the image DP21 in the image OD21.

Similarly, at the operation OP23, cropping and geometry augment operations are performed to the image group MG21 to generate an image group MG23. The image group MG23 includes an image DP22 and the mask image DM22. The image DP22 and the mask image DM22 correspond to each other and have the same cropping relationship and the same geometry relationship. For example, a position of the mask image DM22 in the mask image ODM21 is same as a position of the image DP22 in the image OD21. In some embodiments, the geometry augment operations include at least one of flipping and rotation.

At the operation OP24, other kinds of augment operations are performed to the image DP21, to generate the image D21. At the operation OP25, other kinds of augment operations are performed to the image DP22, to generate the image D22. In some embodiments, the other kinds of augment operations include at least one of color distortion, solarization and auto contrast.

At the operation OP26, the images D21, D22 and the mask image DM21, DM22 are outputted to perform following operations. For example, the images D21, D22 and the mask image DM21, DM22 are outputted as the images D11, D12 and the mask image DM11, DM12 shown in FIG. 1, respectively, to perform the operation OP13.

Figure 3:
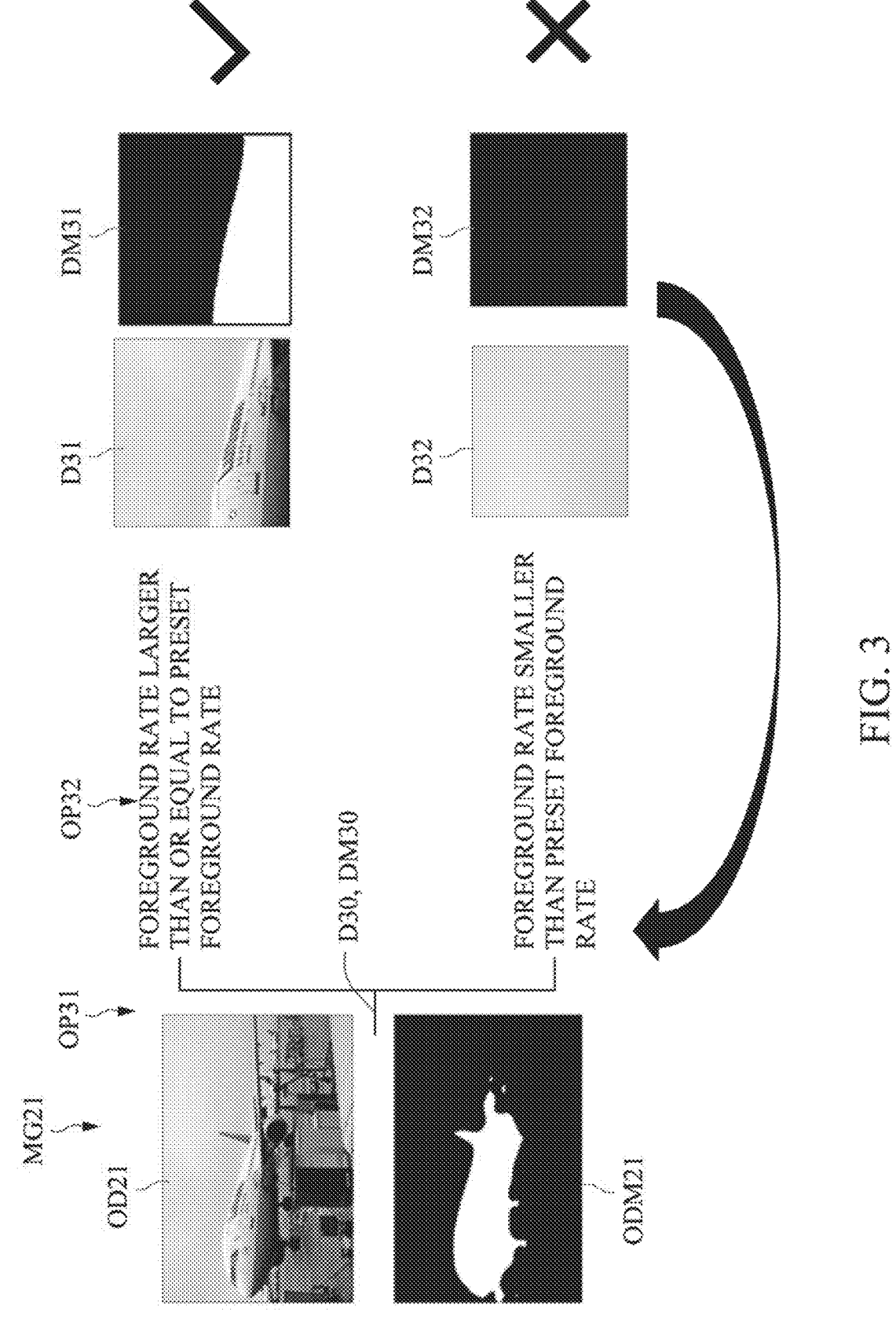
FIG. 3 is a flowchart diagram of further details of the operation shown in FIG. 1, illustrated according to some embodiments of present disclosure.

FIG. 3 is a flowchart diagram of further details of the operation OP12 shown in FIG. 1, illustrated according to some embodiments of present disclosure. As illustratively shown in FIG. 3, the operation OP12 can includes operations OP31-OP32.

At the operation OP31, the cropping is performed to the image group MG21, to generate a cropped image D30 and a cropped mask image DM30. The image D30 and the mask image DM30 have the same position and have the same image size. Specifically, the image D30 and the mask image DM30 have the same coordinate, the same length, and the same width. In some embodiments, the operation OP31 crops a random position of the image group MG21 to generate the image D30 and the mask image DM30. Correspondingly, the operation OP31 can be performed multiple times to generate the multiple image D30 at different locations and the multiple mask image DM30 at different locations.

At the operation OP32, a foreground rate of the image D30 is determined according to the mask image DM30. In some embodiments, the foreground rate of the image D30 is a foreground area in the mask image DM30 divided by the image size of the mask image DM30. The image size of the mask image DM30 is equal to the foreground area plus a background area.

At the operation OP32, when the foreground rate of the image D30 is larger than or equal to a preset foreground rate (for example, 0.3), following operations are performed to the image D30 and the mask image DM30. For example, the operation OP24 are performed to the image D30 and the mask image DM30 as the image D21 and the mask image DM21, to train the model MD1. When the foreground rate of the image D30 is smaller than the preset foreground rate, the operation OP31 is performed again to generate a new image D30 and a new mask image DM30, and the training is not performed with the original image D30 and the original mask image DM30.

In some embodiments, when the image size of the image D30 is smaller than a preset size (for example, when a length or a width of the image D20 is smaller than 224 pixels), the operation OP31 is performed again to generate the image D30 and the mask image DM30 having image sizes lager than or equal to the preset size.

In some embodiments, when the image size of the image D30 is smaller than the preset size or the foreground rate of the image D30 is smaller than the preset foreground rate, the operation OP31 is performed again, and the training is not performed to the model MD1 with the original image D30 and the original mask image DM30. When the image size of the image D30 is larger than or equal to the preset size or the foreground rate of the image D30 is larger than or equal to the preset foreground rate, the following operations are performed to the image D30 and the mask image DM30, such as choosing the image D30 and the mask image DM30 as the image D11 and the mask image DM11 shown in FIG. 1 to perform the operation OP13. As a result, a quality of the image D30 and the mask image DM30 is increased, such that the training result of the model MD1 is improved.

Referring to FIG. 3, each of the images D31 and D32 is an embodiment of the image D30, and each of the mask images DM31 and DM32 is an embodiment of the mask image DM30. The images D31 and D32 correspond to the mask images DM31 and DM32, respectively.

In some embodiments, a ratio of white portions (foreground portions) of the mask image DM31 in the entire mask image DM31 is larger than or equal to the preset foreground rate. Correspondingly, after the operation OP32, the following operations, such as at least one of the operations OP24-OP26, can be performed to the mask image DM31 and the image D31.

In some embodiments, the ratio of white portions (foreground portions) of the mask image DM32 in the entire mask image DM32 is smaller than the preset foreground rate. Correspondingly, after the operation OP32, the operation OP31 is repeated, and the following operations are not performed to the mask image DM32 and the image D32.

Figure 4:
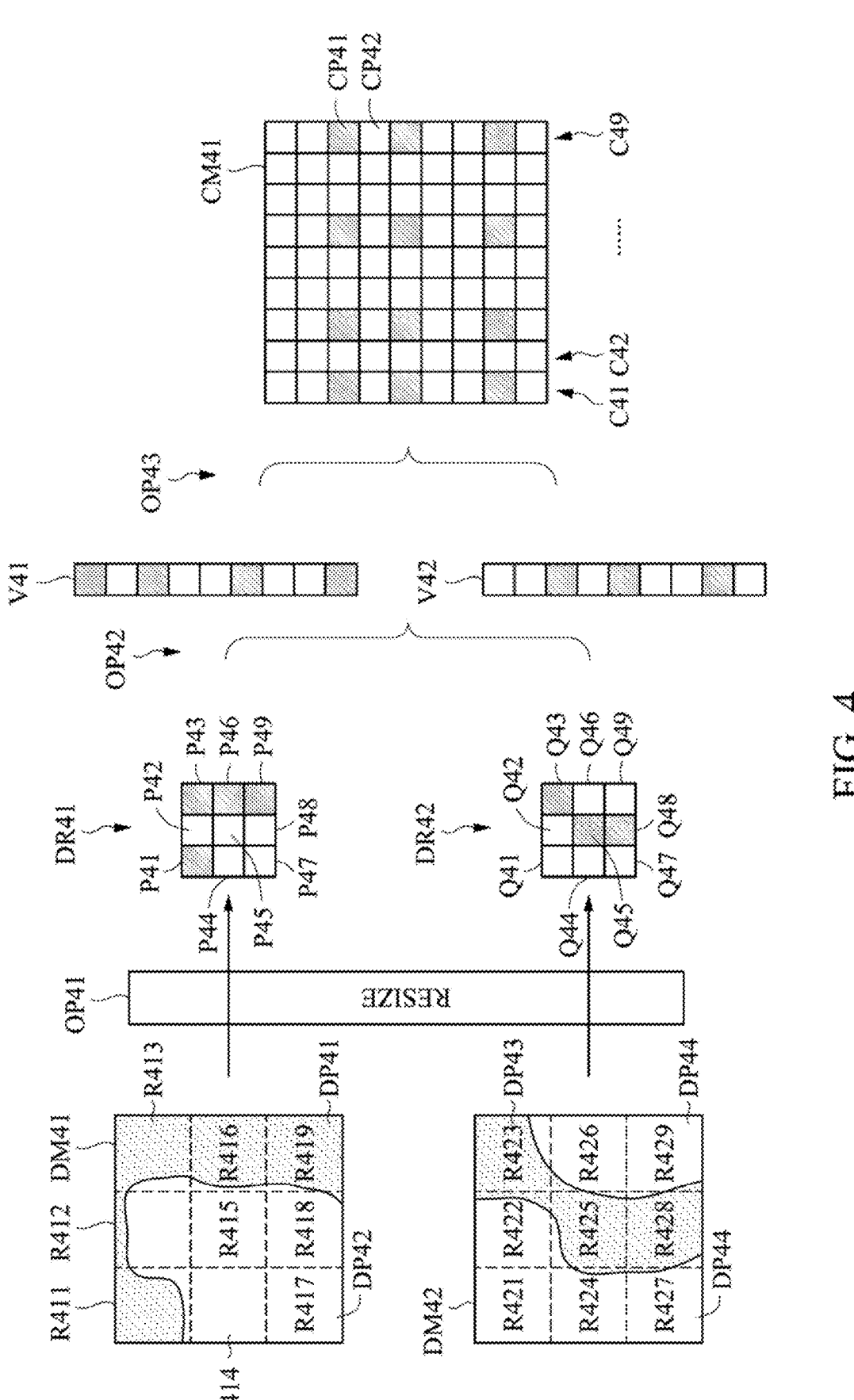
FIG. 4 is a flowchart diagram of a method illustrated according to some embodiments of present disclosure.

FIG. 4 is a flowchart diagram of a method 400 illustrated according to some embodiments of present disclosure. In some embodiments, the method 400 is configured to generate a correlation matrix CM41 of mask images DM41 and DM42. In some embodiments, the method 400 can be performed by a processor and/or a memory. As illustratively shown in FIG. 4, the method 400 includes operations OP41-OP43.

At the operation OP41, the mask images DM41 and DM42 are resized, to generate mask images DR41 and DR42, respectively. As illustratively shown in FIG. 4, the mask image DM41 includes dot portions DP41 and white portions DP42. The mask image DM42 includes dot portions DP43 and white portions DP44. The dot portions DP41 and DP43 correspond to the foregrounds and has a first logic value (in following description, the first logic value is 1 for example). The white portions DP42 and DP44 correspond to the backgrounds and has a second logic value (in following description, the second logic value is 0 for example).

As illustratively shown in FIG. 4, the mask image DR1 includes 3×3 pixels P41-P49, and the mask image DR2 includes 3×3 pixels Q41-Q49. On the other hand, the mask image DM41 includes 3×3 regions R411-R419 divided by dot lines, and the mask image DM42 includes 3×3 regions R421-R429 divided by dot lines. The pixels P41-P49 correspond to the regions R411-R419, respectively. The pixels Q41-Q49 correspond to the regions R421-R429, respectively.

In some embodiments, the logic values of the pixels P41-P49 and Q41-Q49 are determined by the logic values of the pixels in the corresponding regions of the mask image DM41 and DM42. For example, in the region R411, a ratio of the dot portions DP41 is larger than or equal to a preset ratio (for example, 50%). Alternatively stated, in the region R411, a ratio of the logic value of 1 is larger than or equal to the preset ratio. Correspondingly, the pixel P41 has the logic value of 1. For another example, in the region R429, a ratio of the dot portions DP43 is smaller than the preset ratio. Alternatively stated, in the region R429, a ratio of the logic value of 1 is smaller than the preset ratio. Correspondingly, the pixel Q49 has the logic value of 0. In some embodiments, the ratio of the dot portions in a region is a pixel number of the dot portions in the region divided by a total pixel number of the region.

As illustratively shown in FIG. 4, in the regions R411, R413, R416, R419, R423, R425 and R428, the ratios of the dot portions are larger than or equal to the preset ratio. Accordingly, the pixels P41, P43, P46, P49, Q43, Q45 and Q48 have the logic value of 1. In the regions R412, R414, R415, R417, R418, R421, R422, R424, R426, R427 and R429, the ratios of the dot portions are smaller than the preset ratio. Accordingly, the pixels P42, P44, P45, P47, P48, Q41, Q42, Q44, Q46, Q47 and Q49 have the logic value of 0.

At the operation OP42, flatten operations are performed to the mask images DR41 and DR42, to generate vectors V41 and V42. Multiple components of the vector V41 correspond to the logic values of the pixels P41-P49, respectively. Multiple components of the vector V42 correspond to the logic values of the pixels Q41-Q49, respectively. Alternatively stated, the vector V41 can be presented as (1, 0, 1, 0, 0, 1, 0, 0, 1), and the vector V42 can be presented as (0, 0, 1, 0, 1, 0, 0, 1, 0).

At the operation OP43, a matrix CM41 is generated according to the vectors V41 and V42. In some embodiments, an outer product calculation is performed to the vectors V41 and V42 to generate the matrix CM41. The matrix CM41 includes columns C41-C49. The columns C41-C49 correspond to the first component to the ninth component of the vector V41, respectively. Nine values of each of the columns C41-C49 correspond to the first component to the ninth component of the vector V42, respectively.

For example, in response to each of the second, the fourth, the fifth, the seventh and the eighth components of the vector V41 having the logic value of 0, the nine values of each of the columns C42, C44, C45, C47 and C48 have the logic value of 0. In response to each of the first, the third, the sixth and the ninth components of the vector V41 having the logic value of 1, the logic values of each of the columns C41, C43, C46 and C49 are consistent with the vector V42.

As illustratively shown in FIG. 4, the matrix includes dot portions CP41 having the logic value of 1 and white portions CP42 having the logic value of 0. The dot portions CP41 represents that each of the corresponding regions of the mask images DM41 and DM42 corresponds to the foregrounds. For example, in response to each of the regions R411 and R423 corresponding to the foregrounds, the pixel at the first column, the third row of the matrix CM41 has the logic value of 1, and is included in the dot portions CP41.

On the other hand, the white portions CP42 represents that at least one of the corresponding regions of the mask images DM41 and DM42 corresponds to the backgrounds. For example, in response to each of the regions R412 and R424 corresponding to the backgrounds, the pixel at the second column, the fourth row of the matrix CM41 has the logic value of 0, and is included in the white portions CP42. For another example, in response to the regions R419 and R429 correspond to the foregrounds and the backgrounds, respectively, the pixel at the ninth column, the ninth row of the matrix CM41 has the logic value of 0, and is included in white portions CP42.

In summary, the dot portions CP41 indicates a condition that the foregrounds of the images for training (such as the images corresponding to the mask images DM41 and DM42) correspond to each other. The white portions CP42 indicates a condition that the foregrounds of the images for training correspond to the backgrounds or the backgrounds correspond to each other. When training a basic model (such as the model MD1), the foregrounds of the same image (such as the dog in the image OD11 shown in FIG. 1) are classified into the same category, instead of the foregrounds and the backgrounds of the same image (such as the dog and the field in the image OD11) are classified into the same category, or the backgrounds are classified into the category of the foregrounds. Therefore, proper pixels in the images are selected by the dot portions CP41, to train the basic model.

In some approaches, when training a basic model, foregrounds and backgrounds are not distinguished. However, the foregrounds and the backgrounds should not be classified into the same category. As a result, the foregrounds and the backgrounds being not distinguished during the training causes the training result of the basic model is poor.

Compared to above approaches, in some embodiments of present disclosure, the condition that the foregrounds of the mask images DM41 and DM42 correspond to each other are labeled by the dot portions CP41 of the matrix CM41, and the training is performed for the foregrounds during the following operations. As a result, the training result of the model MD1 is improved.

Referring to FIG. 1 and FIG. 4, a part or all of the method 400 can be included in the machine learning method 100. The operations OP161 and OP162 can be implemented by the operation OP41, the operations OP171 and OP172 can be implemented by the operation OP42, and the operation OP18 can be implemented by the operation OP43. The mask images DM41, DM42, DR41, DR42, the vectors V41, V42 and the matrix CM41 are embodiments of the mask images DM11, DM12, DR11, DR12, the vectors V11, V12 and the matrix CM12, respectively. Therefore, some descriptions are not repeated for brevity.

Figure 5:
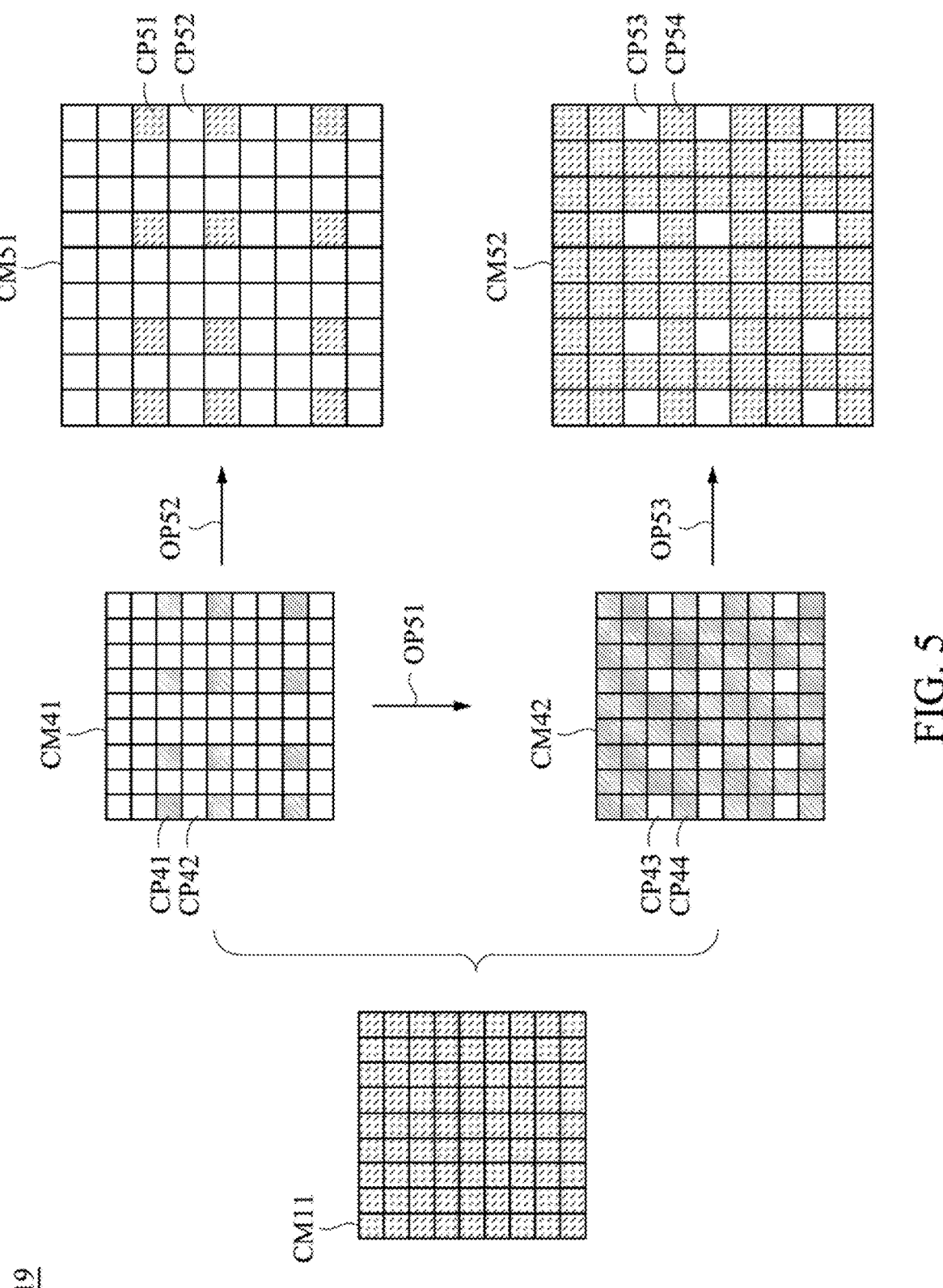
FIG. 5 is a flowchart diagram of further details of the operation shown in FIG. 1, illustrated according to some embodiments of present disclosure.

FIG. 5 is a flowchart diagram of further details of the operation OP19 shown in FIG. 1, illustrated according to some embodiments of present disclosure. As illustratively shown in FIG. 5, the operation OP19 can includes the operations OP51-OP53.

At the operation OP51, a matrix CM42 is generated according to the matrix CM41. In some embodiments, the matrix CM42 is an opposite version of the matrix CM41. For example, at the positions in the matrix CM41 having the logic value of 0, the corresponding positions in the matrix CM42 have the logic value of 1. At the positions in the matrix CM41 having the logic value of 1, the corresponding positions in the matrix CM42 have the logic value of 0.

As illustratively shown in FIG. 5, the matrix CM42 includes dot portions CP44 having the logic value of 1 and white portions CP43 having the logic value of 0. The positions of the dot portions CP44 are consistent with the white portions CP42, and the positions of the white portions CP43 are consistent with the dot portions CP41.

At the operation OP52, a matrix CM51 is generated according to the matrices CM11 and CM41. In some embodiments, values of corresponding pixels of the matrices CM11 and CM41 are multiplied with each other to generate values of corresponding pixels of the matrix CM51. For example, a value of the nth column, mth row of the matrix CM11 is multiplied with a value of the nth column, mth row of the matrix CM41 to generate a value of the nth column, mth row of the matrix CM51. It is noted that n and m are positive integers smaller than or equal to $(N2)^2$. For the matrices CM11, CM41 and CM51, N2 is equal to three.

As illustratively shown in FIG. 5, the matrix CM51 includes dot portions CP51 and white portions CP52. Positions of the dot portions CP51 are consistent with positions of the dot portions CP41. For example, positions of the twelve pixels of the dot portions CP41 in the matrix CM41 is same as positions of the twelve pixels of the dot portions CP51 in the matrix CM51.

In some embodiments, at the operation OP52, similarity values of corresponding positions in the matrix CM11 are selected according to the dot portions CP41, to generate the dot portions CP51. Similarity values of the dot portions CP51 are same as the similarity values of corresponding positions in the matrix CM11. For example, the similarity value of the first column, the third row in the matrix CM51 is same as the similarity value of the first column, the third row in the matrix CM11. In some embodiments, the similarity values of the dot portions CP51 correspond to similarity value comparison results between the foregrounds. On the other hand, in response to the white portions CP42 having the logic value of 0, results of the matrix CM11 multiplied with the white portions CP42 are zero, such that the similarity value of the white portions CP52 are zero.

At the operation OP53, a matrix CM52 is generated according to the matrices CM11 and CM42. In some embodiments, values of corresponding pixels of the matrices CM11 and CM42 are multiplied with each other to generate values of corresponding pixels of the matrix CM52. For example, a value of the nth column, mth row of the matrix CM11 is multiplied with a value of the nth column, mth row of the matrix CM42 to generate a value of the nth column, mth row of the matrix CM52. It is noted that n and m are positive integers smaller than or equal to $(N2)^2$. For the matrices CM42 and CM52, N2 is equal to three.

As illustratively shown in FIG. 5, the matrix CM52 includes dot portions CP54 and white portions CP53. Positions of the dot portions CP54 are consistent with positions of the dot portions CP44. For example, positions of the sixty-nine pixels of the dot portions CP44 in the matrix CM42 is same as positions of the sixty-nine pixels of the dot portions CP54 in the matrix CM52.

In some embodiments, at the operation OP53, similarity values of corresponding positions in the matrix CM11 are selected according to the dot portions CP44, to generate the dot portions CP54. Similarity values of the dot portions CP54 are same as the similarity values of corresponding positions in the matrix CM11. For example, the similarity value of the first column, the second row in the matrix CM52 is same as the similarity value of the first column, the second row in the matrix CM11. In some embodiments, the similarity values of the dot portions CP54 correspond to similarity value comparison results between the backgrounds or between the foregrounds and the backgrounds. On the other hand, in response to the white portions CP43 having the logic value of 0, results of the matrix CM11 multiplied with the white portions CP43 are zero, such that the similarity value of the white portions CP53 are zero.

In summary, the dot portions CP51 and CP54 are obtained by performing the operations OP51-OP53. During the training process of the model MD1, a similarity between the foregrounds should be increased, a similarity between the foregrounds and the backgrounds should be decreased, and the comparison results between the backgrounds should be excluded. Alternatively stated, during the training process of the model MD1, the similarity values of the dot portions CP51 should be increased, and the similarity values of the dot portions CP54 should be decreased. Correspondingly, the loss function LS1 shown in FIG. 1 can be represented as equation (1) as following:

$$LS1 = -\log\frac{F51}{F51 + F54}.$$ (1)

In the equation (1), functions F51 and F54 correspond to the dot portions CP51 and CP54, respectively. When the similarity values of the dot portions CP51 are increased, the function F51 is increased, such that the loss function LS1 is decreased. When the similarity values of the dot portions CP54 are increased, the function F54 is increased, such that the loss function LS1 is increased.

Referring to FIG. 1 and FIG. 5, during the training process of the model MD1, the parameters of the feature extractor F11, F12 and/or the convolution operations OP143, OP144 are adjusted, to change the similarity values of the dot portions CP51 and CP54, such that the loss function LS1 is changed. In some embodiments, when the loss function LS1 is decreased, an accuracy of the model MD1 performing the downstream missions to the foregrounds is increased.

In some embodiments, the loss function LS1 can further be represented as an average value of a loss function LS2($i$) of each pixel, in which the ith loss function LS2($i$) can be represented as equation (1) as following:

$$LS2(i) = -\log\frac{\frac{1}{h}\sum_{j\in CP51}\exp\left(\frac{\cos\left(x_i, x_j^+\right)}{T}\right)}{\frac{1}{h}\sum_{j\in CP51}\exp\left(\frac{\cos\left(x_i, x_j^+\right)}{T}\right)+\frac{1}{\left((N_2)^4 - h\right)}\sum_{k\in CP54}\exp\left(\frac{\cos(x_i, x_k^-)}{T}\right)}$$ (2)

In the equation (2), the positive integer h represents a pixel quantity of the dot portions CP51. The positive integer $(N2)^4$ represents a pixel quantity of the matrix CM52. In the embodiment shown in FIG. 5, the positive integer h is equal to twelve, and the positive integer $(N2)^4$ is equal to eighty-one. It is noted that T is a constant number, such as 0.2 the vector $x_i$ represents feature vectors, such as the vectors FV1(1)-FV1($(N2)^2$) and FV2(1)-FV2($(N2)^2$) shown in FIG. 1. The vector $$x_j^+$$

represents feature vectors of the dot portions CP51. The vector $$x_k^-$$

represents feature vectors of the dot portions CP54. It is noted that $$\cos\left(x_i, x_j^+\right) \text{ and } \cos(x_i, x_k^-)$$

represents the inner product results between the feature vectors. In the embodiment shown in FIG. 5, $$\cos\left(x_i, x_j^+\right)$$

are the similarity values of the dot portions CP51, and $$\cos(x_i, x_k^-)$$

are the similarity values of the dot portions CP54.

In some embodiments, the loss function LS1 can be combined with other loss functions to train various models. For example, the various models can be trained by a total loss function LTT, in which the total loss function LTT can be represented as equation (3) as following:

$$LTT=LS1+LIS$$ (3).

In the equation (3), the function LIS represents other loss functions. In some embodiments, the loss function LIS can be a loss function LIS of instance level.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A machine learning method comprises:
distinguishing foregrounds of a first image and backgrounds of the first image to generate a first mask image;

cropping the first image to generate a second image and a third image;

cropping the first mask image to generate a second mask image and a third mask image, wherein a position of the second mask image and a position of the third mask image correspond to a position of the second image and a position of the third image, respectively;

generating a first feature vector group of the second image and a second feature vector group of the third image by a model;

generating a first matrix according to the first feature vector group and the second feature vector group;

generating a second matrix according to the second mask image and the third mask image;

generating a function according to the first matrix and the second matrix; and adjusting the model according to the function.

2. The machine learning method of claim 1, further comprising:

cropping each of the first image and the first mask image, to generate a fourth image and the second mask image, wherein the position of the second mask image is same as a position of the fourth image;

cropping each of the first image and the first mask image, to generate a fifth image and the third mask image, wherein the position of the third mask image is same as a position of the fifth image;

processing the fourth image to generate the second image; and processing the fifth image to generate the third image.

3. The machine learning method of claim 1, further comprising:

cropping each of the first image and the first mask image, to generate a fourth image and a fourth mask image, wherein a position of the fourth mask image is same as a position of the fourth image;

generating a foreground rate of the fourth image according to the fourth mask image;

when the foreground rate is larger than or equal to a preset foreground rate and an image size of the fourth image is larger than or equal to a preset size, selecting the fourth image and the fourth mask image as the second image and the second mask image; and when the foreground rate is smaller than the preset foreground rate or the image size of the fourth image is smaller than the preset size, cropping each of the first image and the first mask image again.

4. The machine learning method of claim 1, wherein generating the second matrix comprises:

in response to each of foregrounds of the second mask image and foregrounds of the third mask image, generating a first portion of the second matrix; and in response to at least one of backgrounds of the second mask image and backgrounds of the third mask image, generating a second portion of the second matrix, wherein each pixel in the first portion has a first logic value, and each pixel in the second portion has a second logic value different from the first logic value.

5. The machine learning method of claim 4, further comprising:

extracting features of the second image, to generate a first feature map group of the second image, each feature map in the first feature map group having a size;

extracting features of the third image, to generate a second feature map group of the third image, each feature map in the second feature map group having the size;

resizing the second mask image, to generate a fourth mask image having the size;

resizing the third mask image, to generate a fifth mask image having the size; and calculating the fourth mask image and the fifth mask image to generate the second matrix.

6. The machine learning method of claim 4, wherein generating the function comprises:

according to first positions of the first portion, selecting corresponding first similarity values of the first matrix as a third portion, wherein when the first similarity values of the third portion are increased, the function is decreased.

7. The machine learning method of claim 6, wherein generating the function further comprises:

according to second positions of the second portion, selecting corresponding second similarity values of the first matrix as a fourth portion, wherein when the second similarity values of the fourth portion are increased, the function is increased.

8. A machine learning method comprising:

distinguishing foregrounds of a first image and backgrounds of the first image to generate a first mask image;

cropping each of the first image and the first mask image, to generate a second image and a second mask image, wherein a position of the second mask image is same as a position of the second image;

generating a foreground rate of the second image according to the second mask image, the foreground rate being a foreground area divided by an image size of the second image; and when the foreground rate is larger than or equal to a preset foreground rate and the image size of the second image is larger than or equal to a preset size, generating a function at least according to the second mask image and the second image, to train a model.

9. The machine learning method of claim 8, further comprising:

cropping each of the first image and the first mask image, to generate a third image and a third mask image, wherein a position of the third mask image is same as a position of the third image;

generating a first feature map group of the second image and a second feature map group of the third image by the model;

generating a first feature vector group of the first feature map group and a second feature vector group of the second feature map group by the model;

generating a first matrix according to the first feature vector group and the second feature vector group;

generating a second matrix according to the second mask image and the third mask image; and generating the function according to similarity values of the first matrix and positions of a first portion of the second matrix, wherein the first portion corresponds to each of foregrounds of the second mask image and foregrounds of the third mask image.

10. The machine learning method of claim 9, further comprising:

generating the function according to the similarity values of the first matrix and positions of a second portion of the second matrix, wherein the second portion corresponds to at least one of backgrounds of the second mask image and backgrounds of the third mask image, wherein when ones of the similarity values corresponding to the first portion are increased, the function is decreased, and when ones of the similarity values corresponding to the second portion are increased, the function is increased.

11. The machine learning method of claim 9, further comprising:

stacking the first image and the first mask image to generate a first image group;

performing first geometry augment operations to the first image group to generate a second image group;

performing first augment operations to an image of the second image group to generate the second image; and outputting another image of the second image group as the second mask image, wherein the first augment operations are not geometry augment operations.

12. The machine learning method of claim 11, further comprising:

performing second geometry augment operations to the first image group to generate a third image group;

performing second augment operations to an image of the third image group to generate the third image; and outputting another image of the third image group as the third mask image, wherein the second geometry augment operations are different from the first geometry augment operations.

13. The machine learning method of claim 9, wherein generating the second matrix comprises:

resizing the second mask image, to generate a fourth mask image; and resizing the third mask image, to generate a fifth mask image, wherein a size of the fourth mask image is same as a size of the fifth mask image.

14. The machine learning method of claim 13, wherein generating the second matrix further comprises:

flattening the fourth mask image to generate a first vector;

flattening the fifth mask image to generate a second vector; and performing an outer product to the first vector and the second vector to generate the second matrix.

15. The machine learning method of claim 14, further comprising:

selecting first similarity values in the first matrix according to the second matrix; and calculating the function at least with the first similarity values.

16. The machine learning method of claim 15, further comprising:

generating a third matrix opposite to the second matrix;

selecting second similarity values in the first matrix according to the third matrix; and calculating the function with the first similarity values and the second similarity values.

17. A machine learning method comprising:

generating a first mask image including a first portion and a second portion;

determining a logic value of a pixel of a second mask image according to a ratio of the first portion in a corresponding region of the first mask image;

generating a third mask image including a third portion having and a fourth portion;

determining a logic value of a pixel of a fourth mask image according to a ratio of the third portion in a corresponding region of the third mask image;

generating a function according to the second mask image and the fourth mask image; and training a model according to the function, wherein each of the first portion and the third portion corresponds to foregrounds of a first image, and each of the second portion and the fourth portion corresponds to backgrounds of the first image.

18. The machine learning method of claim 17, further comprising:

cropping the first image to generate a second image and a third image; and processing the second image and the third image by the model to generate a first matrix, wherein generating the function comprises generating the function according to the first matrix, and the second image and the third image corresponds to the first mask image and the third mask image, respectively.

19. The machine learning method of claim 18, wherein a position and a size of the second image is same as a position and a size of the first mask image, and a position and a size of the third image is same as a position and a size of the third mask image.

20. The machine learning method of claim 18, wherein generating the function further comprises:

performing calculations to logic values of the second mask image and logic values of the fourth mask image, to generate a second matrix;

generating a third matrix according to positions of the second matrix having a first logic value and similarity values of the first matrix; and generating a fourth matrix according to positions of the second matrix having a second logic value and the similarity values of the first matrix, wherein the first logic value is different from the second logic value, when similarity values of the third matrix are increased, the function is increased, and when similarity values of the fourth matrix are increased, the function is decreased.

* * * * *